(12) United States Patent
Park

(10) Patent No.: US 11,820,236 B2
(45) Date of Patent: Nov. 21, 2023

(54) ECO-FRIENDLY VEHICLE AND METHOD FOR PROVIDING DISTANCE TO EMPTY THEREOF

(71) Applicants: Hyundai Motor Company, Seoul (KR); Kia Motors Corporation, Seoul (KR)

(72) Inventor: Se Hoon Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 64 days.

(21) Appl. No.: 17/026,807

(22) Filed: Sep. 21, 2020

(65) Prior Publication Data

US 2021/0370781 A1   Dec. 2, 2021

(30) Foreign Application Priority Data

Jun. 2, 2020   (KR) .................. 10-2020-0066540

(51) Int. Cl.
  *B60L 15/20*   (2006.01)
(52) U.S. Cl.
  CPC ....... *B60L 15/2045* (2013.01); *B60L 2260/52* (2013.01); *B60L 2260/54* (2013.01)

(58) Field of Classification Search
None
See application file for complete search history.

(56) References Cited

U.S. PATENT DOCUMENTS

| | | | |
|---|---|---|---|
| 9,630,494 B1* | 4/2017 | Glauber | B60K 23/0808 |
| 2012/0176231 A1* | 7/2012 | Skaff | B60K 35/00 340/439 |
| 2014/0051546 A1* | 2/2014 | Maruyama | B60W 10/06 180/65.23 |
| 2017/0072879 A1* | 3/2017 | Weinberg | B60K 35/00 |
| 2020/0189398 A1* | 6/2020 | Suzuki | B60T 8/1766 |

* cited by examiner

*Primary Examiner* — James J Lee
*Assistant Examiner* — David Hatch
(74) *Attorney, Agent, or Firm* — Fox Rothschild LLP

(57) ABSTRACT

An eco-friendly vehicle and method for providing distance to empty thereof are provided. The vehicle includes a processor that predicts a distance to empty (DTE) based on a driving route received from a navigation terminal to output the DTE to an output device. The processor is configured to estimate an engaging frequency of a disconnector based on the driving route and to calculate the DTE based on the engaging frequency of the disconnector.

11 Claims, 4 Drawing Sheets

ECO-FRIENDLY VEHICLE AND METHOD FOR PROVIDING DISTANCE TO EMPTY THEREOF

CROSS-REFERENCE TO RELATED APPLICATION

This application claims the benefit of priority to Korean Patent Application No. 10-2020-0066540, filed on Jun. 2, 2020, the entire contents of which are incorporated herein by reference.

TECHNICAL FIELD

The present disclosure relates to an eco-friendly vehicle and method for providing distance to empty thereof.

BACKGROUND

Eco-friendly vehicles such as electric vehicles and hybrid vehicles may be driven by charging a battery with electric energy and operating a motor using the charged electric energy. The eco-friendly vehicles are providing the function of detecting State Of Charge (SOC) in real time, estimating (e.g., predicting) Distance To Empty (DTE) based on the battery SOC, and displaying DTE on a cluster.

Conventionally, to provide the accurate DTE in a situation where charging infrastructures are insufficient, the DTE is calculated according to a driving route and also considers air conditioning operation information which further draws battery power. However, there are still many differences between the real DTE and the calculated DTE. In particular, in the case of All Wheel Drive (AWD) vehicles, the conventional DTE calculating method does not take into account changes in fuel efficiency based on whether the vehicle is operated in the 2-wheel drive (2WD) or the 4-wheel drive (4WD) mode, and thus the substantial differences between the actual DTE and the calculated DTE may occur.

SUMMARY

The present disclosure provides an eco-friendly vehicle that calculates DTE in consideration of driving information of a disconnector for switching between 2WD and 4WD as well as a driving path of a vehicle, and a DTE providing method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an eco-friendly vehicle may include a processor configured to predict a distance to empty (DTE) based on a driving route received from a navigation terminal to output the DTE to an output device. The processor may be configured to estimate an engaging frequency of a disconnector based on the driving route and to calculate the DTE based on the engaging frequency of the disconnector. Additionally, the processor may be configured to estimate the engaging frequency of the disconnector in consideration of a driving condition on the driving route.

The driving condition may include at least one of a vehicle speed, a wheel torque, a motor torque, a road slope, a road curvature, and a temperature. The processor may be configured to calculate driving points of a first motor and a second motor based on whether the disconnector is engaged. The processor may then be configured to calculate electric vehicle energy efficiency based on motor efficiency according to the driving points of the first motor and the second motor.

The processor may be configured to calculate first energy consumption according to a remaining driving distance of the driving route, based on the electric vehicle energy efficiency. Additionally, the processor may be configured to calculate second energy consumption according to an operation of the disconnector. The processor may be configured to calculate the DTE in consideration of the first energy consumption, the second energy consumption, and a battery level.

According to an aspect of the present disclosure, a method for providing a DTE of an eco-friendly vehicle may include receiving a driving route from a navigation terminal, estimating an engaging frequency of a disconnector based on the driving route, calculating the DTE based on the engaging frequency of the disconnector, and outputting the DTE to an output device. The estimating of the engaging frequency of the disconnector may include estimating the engaging frequency of the disconnector in consideration of a driving condition on the driving route. The driving condition may include at least one of a vehicle speed, a wheel torque, a motor torque, a road slope, a road curvature, and a temperature.

The calculating of the DTE may include calculating driving points of a first motor and a second motor based on whether the disconnector is engaged, calculating electric vehicle energy efficiency based on motor efficiency according to the driving points of the first motor and the second motor, calculating first energy consumption according to a remaining driving distance of the driving route, based on the electric vehicle energy efficiency, calculating second energy consumption according to an operation of the disconnector, and calculating the DTE in consideration of the first energy consumption, the second energy consumption, and a battery level.

The calculating of the driving points of the first motor and the second motor may include calculating speeds and torques of the first motor and second motor when the disconnector is engaged and calculating a speed and a torque of one of the first motor and the second motor when the disconnector is released. Additionally, the calculating of the second energy consumption may include calculating the second energy consumption, using a current and a voltage input to a motor for operating the disconnector based on the engaging frequency of the disconnector.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
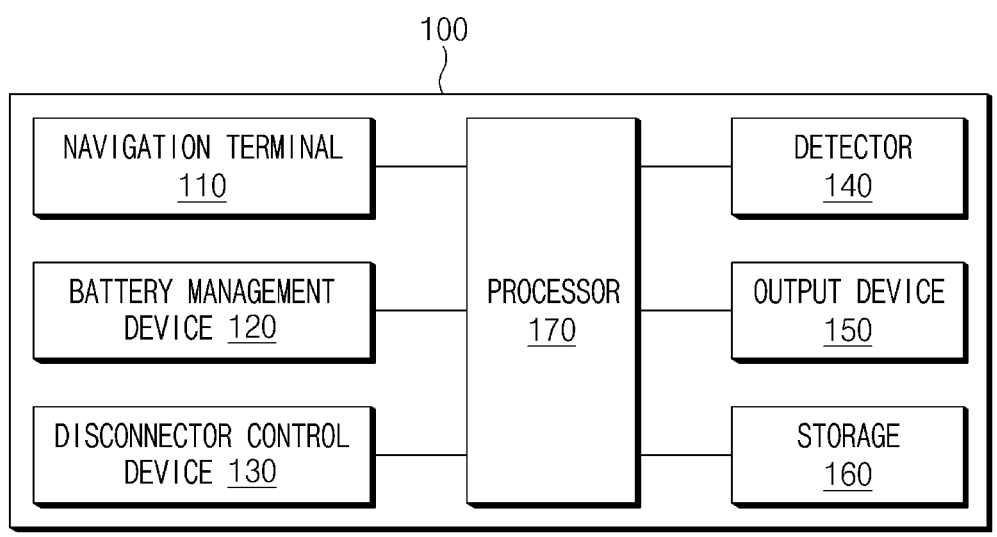
FIG. 1 is a block diagram of an eco-friendly vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the present disclosure and the relevant art and will not be interpreted in an idealized or overly formal sense unless expressly so defined herein.

Figure 2:
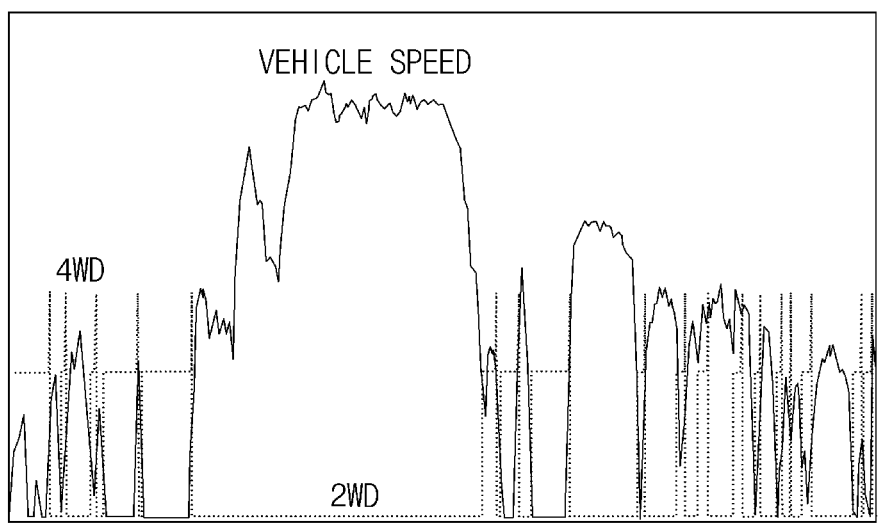
FIG. 2 is a graph illustrating disconnector driving information according to a vehicle speed associated with the present disclosure.
Figure 3:
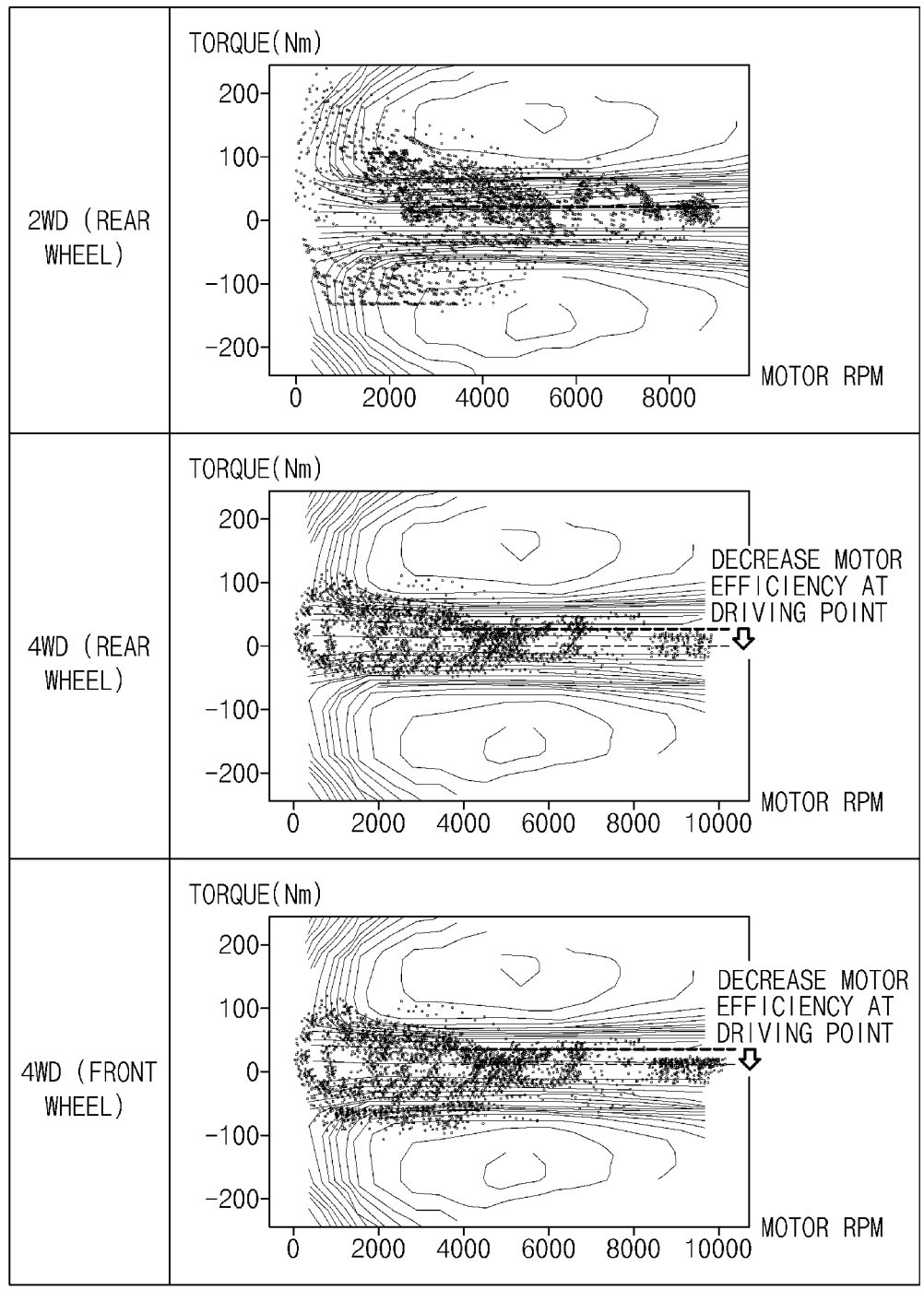
FIG. 3 is a graph illustrating a motor driving point according to a wheel drive method associated with the present disclosure.

FIG. 1 is a block diagram of an eco-friendly vehicle according to an exemplary embodiment of the present disclosure. FIG. 2 is a graph illustrating disconnector driving information according to a vehicle speed associated with the present disclosure. FIG. 3 is a graph illustrating a motor driving point according to a wheel drive method associated with the present disclosure.

Referring to FIG. 1, an eco-friendly vehicle (hereinafter referred to as a "vehicle") 100 may include a navigation terminal 110, a battery management device 120, a disconnector control device 130, a detector 140, an output device 150, storage 160, and a processor 170, which are connected via a vehicle network. The vehicle network may be implemented with Controller Area Network (CAN), a Media Oriented Systems Transport (MOST) network, Local Interconnect Network (LIN), Ethernet, and/or X-by-Wire (Flexray). The vehicle network may be implemented with communication technologies such as Bluetooth, Near Field Communication (NFC), Radio Frequency Identification (RFID), infrared Data Association (IrDA), Ultra-Wideband (UWB), ZigBee, and the like.

When a destination is set, the navigation terminal 110 may be configured to search for a driving route to the destination and guide the vehicle along the driving route. In particular, the navigation terminal 110 may be configured to search for an optimal route by reflecting real-time traffic information upon searching for a driving route. Although not illustrated, the navigation terminal 110 may include a memory configured to store map data, a Global Positioning System (GPS) receiver configured to measure a vehicle's location, a communication module configured to receive traffic information from the outside, and a processor configured to search for a driving route and perform a route guidance along the detected driving route.

The battery management device 120 may be configured to manage a battery that supplies power to an electric device mounted on a vehicle, such as an Electric Control Unit (ECU) and/or a driving motor. The battery management device 120 may be configured to monitor the voltage, current, and temperature of the battery in real time to prevent overcharging and overdischarging. The battery management device 120 may be configured to calculate the remaining amount of the battery, that is, the state of charge (SOC).

The disconnector control device 130 may be configured to switch the wheel drive method by engaging or releasing a disconnector based on the current driving condition of the vehicle 100. The disconnector control device 130 may be configured to determine whether the current driving condition satisfies a disconnector operating condition (e.g., driving condition), to determine whether to engage or release the disconnector. In response to determining that the disconnector is engaged, the disconnector control device 130 may be configured to engage the disconnector to allow the vehicle 100 to drive in a four-wheel drive (4WD), that is, in all-wheel drive (AWD). In response to determining that the disconnector is released, the disconnector control device 130 may allow the vehicle 100 to drive in a two-wheel drive (2WD), that is, a rear wheel drive or a front wheel drive.

The detector 140 may be configured to obtain (e.g., detect) driving information (e.g., driving conditions) using at least one sensor mounted on the vehicle 100. In particular, the sensor may include a wheel speed sensor, a vehicle speed sensor, a 3-axis accelerometer, an inertial measurement unit (IMU), an image sensor, and/or a temperature sensor. The driving information may include a vehicle speed, a wheel speed, a wheel torque, a motor rotation speed (e.g., Revolution Per Minute (RPM)), a motor torque, a road slope (e.g., a gradient; climbing, or falling conditions), rotation (e.g., a road curvature), a temperature, and the like.

The output device 150 may be configured to output information based on the instructions of the processor 170. In other words, the output device 150 may be configured to display vehicle information such as vehicle speed, motor RPM, and/or DTE on the display. The display device 150 may include at least one of a liquid crystal display (LCD), a thin film transistor-liquid crystal display (ITT-LCD), an organic light-emitting diode (OLED) display, a flexible display, a 3D display, a transparent display, a head-up display (HUD), a touch screen, and a cluster.

The storage 160 may be configured to store an electric vehicle energy efficiency calculation algorithm, a driving point calculation algorithm, an energy consumption calculation algorithm, and/or a DTE calculation algorithm. The storage 160 may be configured to store a lookup table in which motor efficiency based on each motor driving point is defined. The storage 160 may be a non-transitory storage medium configured to store instructions executed by the processor 170. Additionally, the storage 160 may be configured to store input data and/or output data according to the operation of the processor 170. The storage 160 may be implemented with at least one of storage media (recording media), such as a flash memory, a hard disk, a Secure Digital (SD) card, a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), a register, and the like.

The processor 170 may be configured to execute the overall operation of the vehicle 100. The processor 170 may be implemented with at least one of an Application Specific Integrated Circuit (ASIC), a Digital Signal Processor (DSP), a Programmable Logic Devices (PLD), Field Programmable Gate Arrays (FPGAs), a Central Processing Unit (CPU), micro-controllers, and microprocessors. The processor 170 may be configured to receive a driving route from the navigation terminal 110. Additionally, the processor 170 may be configured to predict the DTE based on the driving route and output the DTE to the output device 150. The driving route information input from the navigation terminal 110 may include traffic information (e.g., a vehicle speed, or the like), road information (e.g., gradient, rotation, and the like), and/or environmental information (e.g., temperature and/or weather).

The processor 170 may be configured to estimate (e.g., predict) the engaging frequency of a disconnector based on driving conditions along a driving route. The driving conditions may include at least one of a vehicle speed, a wheel torque, a motor torque, a road slope, a road curvature, a temperature, and weather. The engaging frequency of the disconnector may refer to the frequency at which the wheel drive method is switched from 2WD to 4WD.

The processor 170 may be configured to calculate driving points of a first motor (e.g., a front-wheel drive motor) and a second motor (e.g., a rear-wheel drive motor), that is, the motor speed and motor torque, based on the engaging frequency (e.g., operating frequency) of a disconnector. The processor 170 may be configured to calculate the driving points of the first motor and the second motor when the disconnector is engaged. Besides, the processor 170 may be configured to calculate the driving points of the first motor or the second motor when the disconnector is released. At this time, the driving point of either the first motor or the second motor may be calculated based on whether 2WD is a front wheel driving method or a rear wheel driving method. For example, when the vehicle 100 uses the front wheel driving method in 2WD driving, the vehicle 100 may be configured to calculate the driving point of the first motor; when the vehicle 100 uses the rear wheel driving method, the vehicle 100 may be configured to calculate the driving point of the second motor.

Referring to FIG. 2, the engagement or release of the disconnector may be determined based on the vehicle speed and motor torque, and thus the driving conditions on a driving route may be predicted in advance to predict the operating frequency (e.g., engaging frequency) of the disconnector and the motor driving point when the disconnector is engaged and released. Accordingly, in this exemplary embodiment, the frequency at which the disconnector is engaged may be predicted by predict the driving condition on the driving route; the driving points of the front-wheel drive motor and the rear-wheel drive motor may be predicted based on the predicted disconnector engaging frequency.

The processor 170 may be configured to calculate electric vehicle energy efficiency [km/kWh] based on the motor efficiency according to the calculated driving point. The processor 170 may be configured to identify a motor efficiency according to a driving point of each motor with reference to a reference table stored in advance. The processor 170 may be configured to calculate the electric vehicle energy efficiency by reflecting the identified motor efficiency. In addition, the processor 170 may be configured to calculate the first energy consumption according to the remaining driving distance of the driving route based on the electric vehicle energy efficiency. The processor 170 may be configured to calculate the second energy consumption according to the operation of the disconnector. The processor 170 may be configured to measure a current and voltage input to a motor that supplies power required to operate a disconnector, using a sensor. The processor 170 may be configured to calculate the second energy consumption, using the measured current and voltage.

Further, the processor 170 may be configured to calculate the total energy consumption by adding the first energy consumption and the second energy consumption. The processor 170 may be configured to calculate the DTE based on the total energy consumption and the remaining battery capacity (e.g., the remaining amount). At this time, the processor 170 may be configured to receive the battery level from the battery management device 120. The processor 170 may be configured to output the calculated DTE to the output device 150. For example, the processor 170 may be configured to display the calculated DTE on a cluster.

Referring to FIG. 3, as compared to 2WD driving, the torque is generated by the front-wheel drive motor (e.g., a front-wheel motor) and the rear-wheel drive motor (e.g., a rear-wheel motor) during 4WD driving, and thus each motor may be operated at a lower torque, and the motor efficiency may be reduced. This reduction in motor efficiency correlates with fuel economy. Accordingly, in the exemplary embodiment, how much efficiency decreases compared to 2WD driving may be predicted and reflected in the DTE value, and thus the DTE accuracy may be improved. In addition, when the DTE decreases and power restriction occurs, the DTE may be expanded by increasing fuel efficiency through 2WD driving control.

Figure 4:
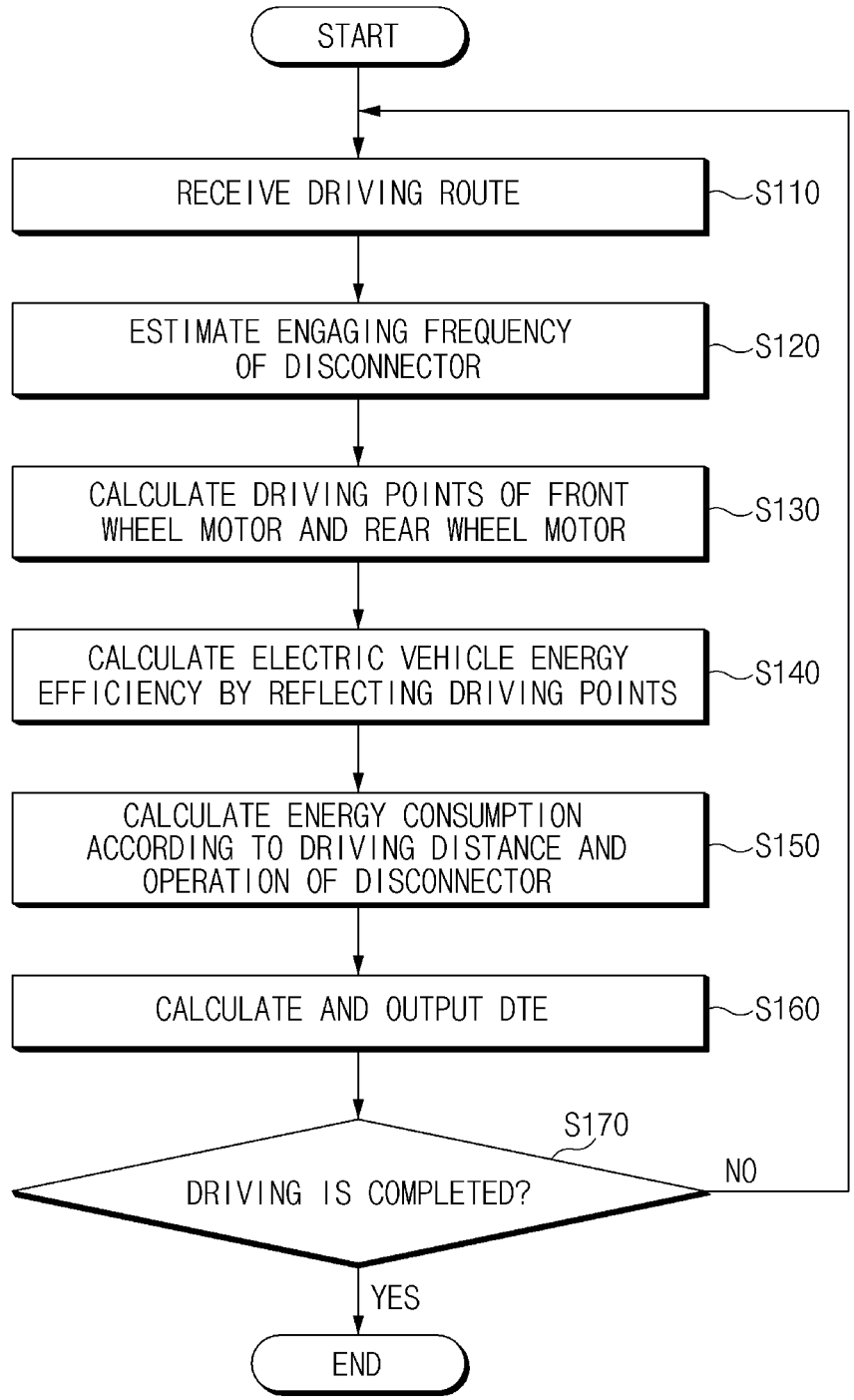
FIG. 4 is a flowchart illustrating a method for providing DTE of an eco-friendly vehicle according to an exemplary embodiment of the present disclosure.

FIG. 4 is a flowchart illustrating a method for providing DTE of an eco-friendly vehicle according to an exemplary embodiment of the present disclosure. Referring to FIG. 4, the processor 170 of the vehicle 100 may be configured to receive a driving route from the navigation terminal 110 (S110).

The processor 170 may be configured to estimate the engaging frequency of a disconnector based on the driving route (S120). The processor 170 may be configured to estimate the engaging frequency of the disconnector based on a driving condition along the driving route. The processor 170 may be configured to determine whether the disconnector is engaged, by determining whether a driving condition satisfies the disconnector engaging condition. The driving condition may include at least one of a vehicle speed, a wheel torque, a motor torque, a road slope, a road curvature, and a temperature.

The processor 170 may be configured to calculate driving points of a first motor and a second motor according to whether the disconnector is engaged (S130). The processor 170 may be configured to calculate the speeds and torques of the first motor and second motor when the disconnector is engaged. The processor 170 may be configured to calculate the speed and torque of one of the first motor and the second motor when the disconnector is released. In addition, the processor 170 may be configured to calculate electric vehicle energy efficiency based on the motor efficiency according to the driving points of the first motor and the second motor (S140). The processor 170 may be configured to identify a motor efficiency according to a driving point of each motor with reference to a reference table stored in advance. The processor 170 may be configured to calculate the electric vehicle energy efficiency by reflecting motor efficiency.

Further, the processor 170 may be configured to calculate the first energy consumption based on the remaining driving distance of the driving route and the second energy consumption according to the operation of the disconnector, based on the electric vehicle energy efficiency (S150). The processor 170 may be configured to calculate the second energy consumption, using the current and voltage input to the motor for operating the disconnector based on the engaging frequency of the disconnector. The processor 170 may be configured to calculate DTE based on the first energy consumption and the second energy consumption (S160). The processor 170 may be configured to calculate the total energy consumption by adding the first energy consumption and the second energy consumption. The processor 170 may be configured to calculate the DTE, using the calculated total energy consumption and the remaining battery capacity. The processor 170 may be configured to determine whether the driving is completed (S170). Then, the processor 170 may be configured to terminate the DTE calculation when the driving is completed and calculate the DTE by repeatedly performing S110 to S160 when the driving is not completed.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, exemplary embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

According to an exemplary embodiment of the present disclosure, it may be possible to provide the DTE of the vehicle more accurately because not only the driving route information, but also the change in fuel consumption and energy consumption according to the operation of a disconnector when the DTE of the vehicle is calculated.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An eco-friendly vehicle, comprising:
   a processor configured to output a distance to empty (DTE) to an output device; and
   the output device configured to display the DTE on a display,
   wherein the processor is configured to:
      receive a driving route from a navigation terminal;
      estimate an engaging frequency of a disconnector based on the driving route; and
      calculate the DTE based on the engaging frequency of the disconnector,
   wherein the engaging frequency of the disconnector is a frequency at which a wheel drive method is switched from a two-wheel drive (2WD) to a four-wheel drive (4WD),
   wherein the processor is configured to predict how much motor efficiency decreases during driving in the 4WD compared to the 2WD and reflect the predicted result in the DTE, and
   wherein the processor is configured to:
      calculate a first energy consumption based on a remaining driving distance of the driving route and an electric vehicle energy efficiency;
      calculate a second energy consumption using a current and a voltage input to a motor for operating the disconnector based on the engaging frequency of the disconnector; and
      calculate the DTE based on the first energy consumption and the second energy consumption.

2. The eco-friendly vehicle of claim 1, wherein the processor is configured to estimate the engaging frequency of the disconnector based on a driving condition on the driving route.

3. The eco-friendly vehicle of claim 2, wherein the driving condition includes at least one of a vehicle speed, a wheel torque, a motor torque, a road slope, a road curvature, and a temperature.

4. The eco-friendly vehicle of claim 1, wherein the processor is configured to calculate driving points of a first motor and a second motor according to whether the disconnector is engaged.

5. The eco-friendly vehicle of claim 4, wherein the processor is configured to calculate the electric vehicle energy efficiency based on the motor efficiency according to the driving points of the first motor and the second motor.

6. The eco-friendly vehicle of claim 1, wherein the processor is configured to calculate the DTE based on the first energy consumption, the second energy consumption, and a battery level.

7. A method for providing a distance to empty (DTE) of an eco-friendly vehicle, comprising:
- receiving, by a processor, a driving route from a navigation terminal;
- estimating, by the processor, an engaging frequency of a disconnector based on the driving route;
- calculating, by the processor, the DTE based on the engaging frequency of the disconnector;
- outputting, by the processor, the DTE to an output device; and
- displaying, by the output device, the DTE on a display,
- wherein the engaging frequency of the disconnector is a frequency at which a wheel drive method is switched from a two-wheel drive (2WD) to a four-wheel drive (4WD),
- wherein the calculating of the DTE includes:
  - predicting, by the processor, how much motor efficiency decreases during driving in the 4WD compared to the 2WD, and
  - reflecting, by the processor, the predicted result in the DTE, and
- wherein the calculating of the DTE includes:
  - calculating, by the processor, a first energy consumption based on a remaining driving distance of the driving route, based on an electric vehicle energy efficiency;
  - calculating, by the processor, a second energy consumption using a current and a voltage input to a motor for operating the disconnector based on the engaging frequency of the disconnector; and
  - calculating, by the processor, the DTE based on the first energy consumption and the second energy consumption.

8. The method of claim 7, wherein the estimating of the engaging frequency of the disconnector includes:
- estimating, by the processor, the engaging frequency of the disconnector based on a driving condition on the driving route.

9. The method of claim 8, wherein the driving condition includes at least one of a vehicle speed, a wheel torque, a motor torque, a road slope, a road curvature, and a temperature.

10. The method of claim 7, wherein the calculating of the DTE includes:
- calculating, by the processor, driving points of a first motor and a second motor according to whether the disconnector is engaged;
- calculating, by the processor, the electric vehicle energy efficiency based on the motor efficiency according to the driving points of the first motor and the second motor;
- calculating, by the processor, the DTE based on the first energy consumption, the second energy consumption, and a battery level.

11. The method of claim 10, wherein the calculating of the driving points of the first motor and the second motor includes:
- calculating, by the processor, speeds and torques of the first motor and second motor when the disconnector is engaged; and
- calculating, by the processor, a speed and a torque of one of the first motor and the second motor when the disconnector is released.

* * * * *